US008042091B2

(12) United States Patent
Koehler et al.

(10) Patent No.: US 8,042,091 B2
(45) Date of Patent: Oct. 18, 2011

(54) AUTOMATIC COMPOSITION OF MODEL TRANSFORMATIONS

(75) Inventors: Jana Koehler, Oberrieden (CH); Jochen M. Kuester, Zürich (CH); Ksenia Ryndina, Zürich (CH); Jussi H. Vanhatalo, Zürich (CH); Michael S. Wahler, Zürich (CH); Olaf W. Zimmermann, Zürich (CH)

(73) Assignee: International Business Machines Corporation, Armonk, NY (US)

( * ) Notice: Subject to any disclaimer, the term of this patent is extended or adjusted under 35 U.S.C. 154(b) by 883 days.

(21) Appl. No.: 12/049,241

(22) Filed: Mar. 14, 2008

(65) Prior Publication Data

US 2008/0229276 A1    Sep. 18, 2008

(30) Foreign Application Priority Data

Mar. 14, 2007    (EP) ..................... 07104153

(51) Int. Cl.
*G06F 9/44*    (2006.01)
(52) U.S. Cl. ........ 717/104; 717/131; 717/132; 717/144; 717/156
(58) Field of Classification Search ........................ None
See application file for complete search history.

(56) References Cited

U.S. PATENT DOCUMENTS

| | | | | |
|---|---|---|---|---|
| 5,553,276 A | * | 9/1996 | Dean | 713/500 |
| 5,845,289 A | * | 12/1998 | Baumeister et al. | 1/1 |
| 7,130,934 B2 | * | 10/2006 | Barry et al. | 710/22 |
| 7,290,056 B1 | * | 10/2007 | McLaughlin, Jr. | 709/230 |
| 7,350,168 B1 | * | 3/2008 | Mathur et al. | 716/107 |
| 2005/0172050 A1 | * | 8/2005 | Barry et al. | 710/22 |
| 2006/0173885 A1 | * | 8/2006 | Moir et al. | 707/101 |
| 2007/0094639 A1 | * | 4/2007 | Kefford et al. | 717/110 |
| 2009/0007057 A1 | * | 1/2009 | Taillefer | 717/104 |

OTHER PUBLICATIONS

Title: Proposed Design Notation for Model Transformation, author: Rahim et al, source: IEEE, dated: Mar. 26, 2008.*
Title: TP model transformation as a way to LMI-based controller design, author: Baranyi, source: IEEE, dated: Apr. 5, 2004.*

* cited by examiner

*Primary Examiner* — Chameli Das
(74) *Attorney, Agent, or Firm* — Ido Tuchman; William J. Stock (57) ABSTRACT

Techniques for composition of model transformations from a predetermined set of model transformations. A state machine is provided in memory. The states are defined in the state machine in terms of predetermined model attributes. In response to specification of a target state for an input model to be transformed, an execution sequence in the state machine, between a start state corresponding to the input model and an end state corresponding to the specified target state, is selected. Each transformation in the selected sequence is then successively executed on the input model. After executing each transformation in the selected sequence, the transformed input model state is compared to the model state defined in the state machine to determine if the selected sequence is inoperable for the input model. If so, an alternative execution sequence in the state machine, between the input model state and the specified target state, is selected.

22 Claims, 6 Drawing Sheets

| Transformation | Preconditions | Effects |
|---|---|---|
| Cycle Removal (T2) | controlFlow = CANF<br>atLeastOneCycle<br><br>onlyOneToOnePinsets<br>not existOverlappingPinsets | controlFlow = CANF<br>atLeastOneCycle or not atLeastOneCycle<br>onlyOneToOnePinsets<br>not existOverlappingPinsets |
| to Pinset Normal Form (T3) | controlFlow <> PNF<br>not existOverlappingPinsets<br>not existPinsWithMultiplicity<br>not existStreamingOutputPinsets<br>not existExceptionOutputPinsets<br>not existMultiEdges<br>not existUnconnectedPins | controlFlow = PNF<br>not existOverlappingPinsets<br>not existPinsWithMultiplicity<br>not existStreamingOutputPinsets<br>not existExceptionOutputPinsets<br>not existMultiEdges<br>not existUnconnectedPins |
| to Control Action Normal Form (T1) | controlFlow <> CANF<br>not existOverlappingPinsets<br>not existPinsWithMultiplicity<br>not existStreamingOutputPinsets<br>not existExceptionOutputPinsets<br>not existMultiEdges<br>not existUnconnectedPins | controlFlow = CANF<br>not existOverlappingPinsets = false<br>not existPinsWithMultiplicity = false<br>not existStreamingOutputPinsets = false<br>not existExceptionOutputPinsets = false<br>not existMultiEdges = false<br>not existUnconnectedPins = false |

AUTOMATIC COMPOSITION OF MODEL TRANSFORMATIONS

CROSS-REFERENCE TO RELATED APPLICATIONS

This application claims priority under 35 U.S.C. §119 to European Patent Application No. 07104153.7 filed Mar. 14, 2007, the entire text of which is specifically incorporated by reference herein.

BACKGROUND OF THE INVENTION

This invention relates generally to the composition of model transformations, and more particularly to the automatic composition of model transformations to produce complex transformations for transforming input models into desired states.

Model-driven engineering (MDE) is a technique employed in various engineering fields such as software, system and data engineering. MDE involves the systematic use of models as primary engineering artifacts. As part of the engineering process, model transformation algorithms may be employed for converting models from an initial state to a desired, target state. For example, in model-driven software development or model-driven business transformation, the transformation of models such as models defined in the Unified Modeling Language (UML) plays an important role. Model transformations are integral components which facilitate techniques such as aspect-oriented modeling, system automation, platform independence via Model Driven Architecture (MDA), and so forth. Transformations can be arbitrarily complex, and thus a decomposition of transformations is desirable. Each transformation should ideally be as simple and general as possible to reduce complexity and increase reusability. Complex transformations can then be expressed as a composition of atomic or complex transformations.

There are, as yet, no established methodology or standard techniques for the composition of transformations. A composite transformation is usually defined by a program or a workflow in which atomic transformations are the main actions. This workflow description has to be created by a developer who needs in-depth knowledge about the semantics of the transformation in order to respect dependencies between the transformations. A problem here is that execution of a transformation may not run correctly, leading to failure of the overall process. Another problem is that transformations can be non-deterministic. That is, the transformation may have more than one possible outcome depending on some aspect of a model being transformed. Where execution of a constituent transformation does not run deterministically, the overall complex transformation process can fail just as with a transformation error. Problems of this kind are not addressed by current model transformation tools and make model transformations a challenge for both tools and users.

BRIEF SUMMARY OF THE INVENTION

A first aspect of the present invention provides a method for automatic composition of model transformations in a data processing system from a predetermined set of model transformations stored in memory of the system. The method comprises providing in the memory a state machine which defines, for all possible execution sequences of transformations in said set, the start and potential end states of a model for each transformation in each sequence, said states being defined in the state machine in terms of predetermined model attributes; in response to specification of a target state for an input model to be transformed by the system, selecting a said execution sequence in the state machine between a start state corresponding to the input model and an end state corresponding to the target state; successively executing on the input model each transformation in the selected sequence; and after executing each transformation in the selected sequence, comparing the transformed input model state to the model state defined in the state machine to determine if the selected sequence is inoperable for the input model and, if so, selecting an alternative execution sequence in the state machine between the input model state and the target state; wherein the steps of executing transformations and comparing states are continued until either the target state is achieved for the input model or no alternative execution sequence is available in the state machine.

With one possible method embodying this invention, therefore, a composite transformation for converting an input model to a target state can be automatically constructed from a set of constituent transformations stored in system memory. The basis for this process is a state machine which defines all possible execution sequences of the constituent transformations. Specifically, for each possible execution sequence, the start and potential end states of a model transformation are defined, in terms of predetermined model attributes, for each transformation in the sequence. For deterministic transformations there will be only one potential end state, but for non-deterministic transformations all potential end states will be defined. A sequence of transformations between any two states in the state machine represents a particular composite transformation which can be constructed from the available constituent transformations. When a desired target state is specified for an input model, the system initially selects a sequence between two states corresponding to the input model and target states respectively. However, to account for the problems of erroneous execution and non-determinism discussed above, the system checks the selected sequence by successively executing each transformation on the input model and checking the resulting model state against the state in the state machine, also referred to as desired model state. If a transformation fails to run correctly, or a non-deterministic transformation yields the wrong end state for the input model, then the currently selected sequence will be deemed inoperable. In this case, the system checks the state machine for an alternative sequence between the input model and target states, indicating a potential alternative composite transformation. This sequence will then be checked as before, the process continuing until either the target state of the input model is achieved or all available sequences have been deemed inoperable. Where the target state is achieved, the currently selected execution sequence represents the successful composite transformation.

It will be seen from the above that aspects of invention offer a practical and efficient technique for automatic composition of model transformations on-demand. Use of the state machine together with the sequence selection process just described provides an elegantly simple yet highly efficient mechanism for handling erroneous or non-deterministic transformation steps, ensuring generation of composite transformations which function correctly for the input model in question.

It will be appreciated that, in the step of comparing the transformed input model state to the desired model state after each transformation, the desired state here will be the sole end state of a deterministic transformation or the particular end state of a non-deterministic transformation which lies in the currently-selected execution sequence.

For simplicity, some embodiments may determine that the selected sequence is inoperable on detecting that the transformed input model state does not match the desired state for any transformation. In other embodiments, however, the system could re-execute the last transformation if a mismatch is detected, and only determine that the current sequence is inoperable if the states do not match a second time. This would allow for the possibility of one-off execution errors in running of an otherwise successful transformation.

When an execution sequence is deemed inoperable and an alternative sequence is selected, not all transformations from the beginning of the new sequence are necessarily executed in all cases. In particular, if the new sequence branches from an earlier sequence sharing a common initial section which was successfully traversed for the input model, then the system may simply commence checking of new transformations at the branch point, avoiding unnecessary rechecking of the initial transformations. Techniques for implementing this will be described in detail below.

In particularly embodiments, the method includes generating a workflow from the state machine in response to specification of the target state for the input model. This workflow includes all possible execution sequences in the state machine between the start state corresponding to the input model and the target state, and the configuration of the workflow is such that execution of the workflow implements the steps of executing transformations and comparing states. The workflow can then be executed to derive the composite transformation as already described. An example such an embodiment will be described in detail below.

While embodiments might be envisaged where the desired system output is the composite transformation derived for an input model, more usually the transformed input model, in the target state, will be supplied as an output to a user of the system.

Advantageously, the system is able to derive the state machine for the set of transformations stored in system memory. In particular, in preferred embodiments a contract is stored in the memory for each transformation. The contract defines preconditions and effects of that transformation in terms of the predetermined model attributes. The state machine can then be generated by appropriate processing of the contracts for the set of transformations. An example of this will be described below.

The predetermined model attributes used for defining states in the state machine, and the transformation contracts just mentioned, could be defined in various ways but conveniently comprise predicates in propositional logic. The set of attributes used in a given system will of course depend on the particular models with which the system might be used as well as the constituent transformations for the composition process. As discussed further below, this set of attributes can effectively be seen as an abstraction of the model state space with which the system is designed to operate.

Another aspect of the invention provides a computer program stored in computer readable storage medium comprising program code means for causing a data processing system to perform a method for automatic composition of model transformations as described with reference to the first aspect of the invention. It will be understood that "data processing system" is used here in the most general sense and includes any device, component or distributed system which has a data processing capability for implementing a computer program. Such a computer program may thus comprise separate program modules for controlling different components of a distributed system where provided. Moreover, a computer program embodying the invention may constitute an independent program or may be a component of a larger program, and may be supplied, for example, embodied in a computer-readable medium such as a disk. The program code means of the computer program may comprise any expression, in any language, code or notation, of a set of instructions intended to cause data processing system to perform the method in question, either directly or after either or both of (a) conversion to another language, code or notation, and (b) reproduction in a different material form.

Another aspect of the invention provides a system for automatic composition of model transformations from a predetermined set of model transformations. The system comprises memory storing said set of model transformations and storing a state machine which defines, for all possible execution sequences of transformations in the set, the start and potential end states of a model for each transformation in each sequence, said states being defined in the state machine in terms of predetermined model attributes, and a transformation controller adapted, in response to specification of a target state for an input model to be transformed, to: select a said execution sequence in the state machine between a start state corresponding to the input model and an end state corresponding to the target state; successively execute on the input model each transformation in the selected sequence; and after executing each transformation in the selected sequence, to compare the transformed input model state to the desired model state defined in the state machine to determine if the selected sequence is inoperable for the input model and, if so, to select an alternative execution sequence in the state machine between the input model state and the target state; wherein the transformation controller is adapted to continue the steps of executing transformations and comparing states until either the target state is achieved for the input model or no alternative execution sequence is available in the state machine.

Yet a further aspect of the invention provides a system for automatic composition of model transformations from a predetermined set of model transformations, the system comprising: memory storing said set of model transformations and, for each transformation, a contract defining preconditions and effects of that transformation in terms of predetermined model attributes; a state machine generator adapted for processing the transformation contracts to generate a state machine defining, for all possible execution sequences of transformations in the set, the start and potential end states of a model for each transformation in each sequence, said states being defined in the state machine in terms of said predetermined model attributes; and a transformation controller adapted, in response to specification of a target state for an input model to be transformed, to select a said execution sequence in the state machine between a start state corresponding to the input model and an end state corresponding to the target state, successively execute on the input model each transformation in the selected sequence, and after executing each transformation in the selected sequence, to compare the transformed input model state to the desired model state defined in the state machine to determine if the selected sequence is inoperable for the input model and, if so, to select an alternative execution sequence in the state machine between the input model state and the target state, the transformation controller being adapted to continue the steps of executing transformations and comparing states until either the target state is achieved for the input model or no alternative execution sequence is available in the state machine.

Where features are described herein with reference to an embodiment of one aspect of the invention, corresponding features may be provided in embodiments of another aspect of the invention.

BRIEF DESCRIPTION OF THE SEVERAL VIEWS OF THE DRAWINGS

Preferred embodiments of the invention will now be described, by way of example, with reference to the accompanying drawings in which.

DETAILED DESCRIPTION OF THE INVENTION

Figure 1:
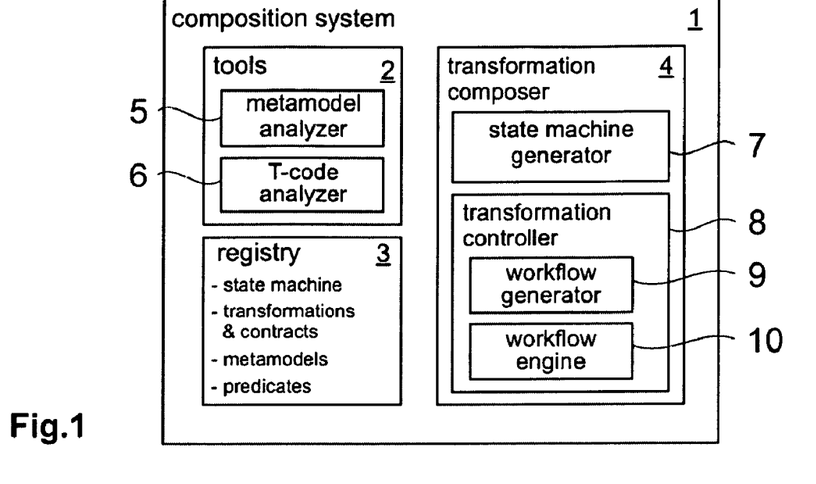
FIG. 1 is a schematic representation of a transformation composition system embodying the invention.

FIG. 1 is a schematic illustration of a transformation composition system 1 embodying the invention showing the main components involved in the composition process. The system 1 is implemented by specialized software running on a computer with interfaces for system operators to provide inputs controlling set up of the system as described below. The main components of system 1 are represented generally in the figure by software tools 2, memory 3 for storing a system registry in operation, and a transformation composer 4. The software tools 2 here include a metamodel analyzer 5 and a transformation code (T-code) analyzer 6 discussed further below. The system registry holds a state machine derived in operation of the transformation composition system, together with the set of constituent transformations, defined by respective software modules, for use in the composition process. The registry 3 also holds metamodel definitions, state space predicates and transformation contracts as described further below. The transformation composer 4 comprises a state machine generator 7 and a transformation controller 8. The transformation controller 8 comprises a workflow generator 9 and a workflow engine 10. This transformation controller performs the core transformation composition process once various system setup operations have been completed.

The basis for the transformation composition process is a state machine which defines the possible execution sequences of transformations stored in registry 3 in operation. The present embodiment allows derivation of this state machine from first principles for models in a given technology field and a set of transformations applicable to that field. The heart of this process is that each transformation is annotated with a contract which defines the preconditions and effects (postconditions) reflecting the state of an input model (preconditions) and the state of the output model (effects) for this transformation. To achieve this, an abstraction of the state space of a model is defined. This state space abstraction consists of a finite number of model attributes. In this embodiment, the model attributes are predicates in propositional logic. The identification of predicates relevant for the state space abstraction can be performed using generally known techniques, e.g. as described in the following documents: "Construction of abstract state graphs with PVS", Graf & Saidi, Proceedings of the 9th International Conference on Computer Aided Verification, 1997; and "Using Predicate Abstraction to Reduce Object-Oriented Programs for Model Checking", Visser, Park & Penix, Proceedings of the third workshop on Formal Methods in Software Practice, ACM Press New York, N.Y., USA, 2000, 3-182. In the present system, the process of extracting the predicates relevant for the state space abstraction is performed by system operators supported by the analyzer tools 5 and 6 of system 1. In particular, the predicate extraction process makes use of knowledge of both the model domain in question and the operation of the transformations to be applied to the models. Models in the domain of interest can be classified as of particular types, defined by respective metamodels. An operator with expertise in the model domain can define these metamodels which are then stored in registry 3 of the system. The metamodels are subsequently analyzed by the operator, with the aid of metamodel analyzer tool 5, based on knowledge of the model domain to identify predicates for the state space abstraction. The transformations stored in registry 3 are also analyzed for predicates by an operator, e.g. a transformation developer, with the aid of T-code analyzer tool 6. The result of the analyses is a set of predicates which are relevant with respect to the semantics of the metamodels, the modeling domain in question and the set of transformations for the composition process. This predicate set is stored in registry 3 and forms the state space abstraction for the system.

Figure 2:
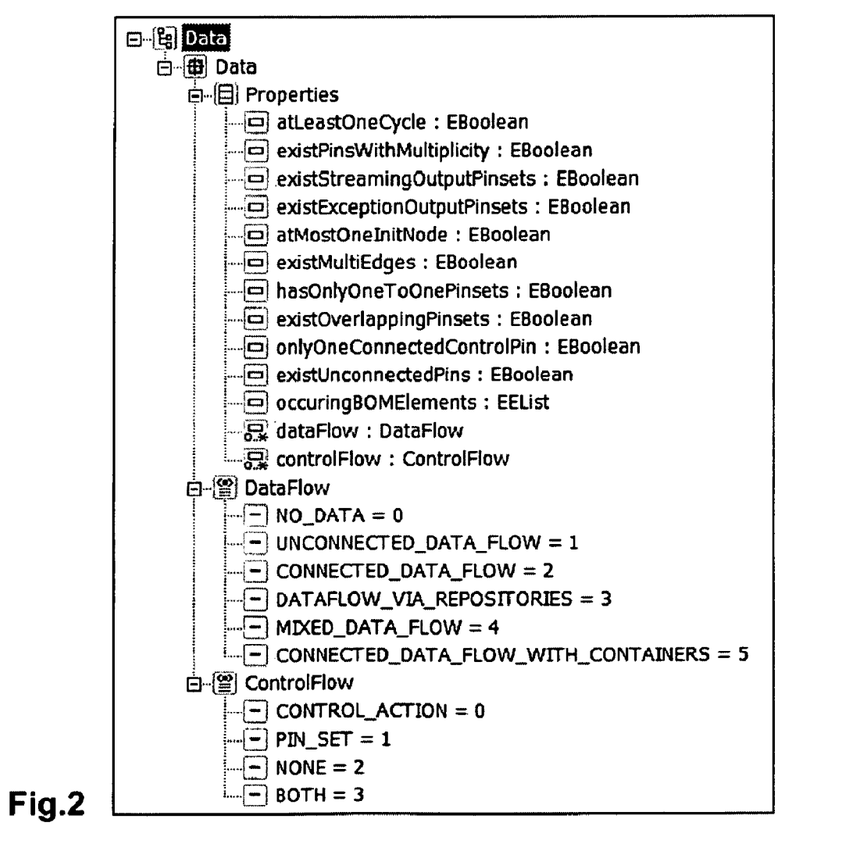
FIG. 2 shows an example of a model state space abstraction used in operation of the FIG. 1 system.

FIG. 2 shows an example of a state space abstraction, in this case for a business process model. Here, semantic properties of a process are captured as predicates, e.g. whether the process contains unstructured cycles in the control flow (atLeastOneCycle), or what kind of data flow occurs in it (dataFlow). Metamodel analysis tool 5 can auto-generate certain state space predicates from the metamodel by quantifying over the metamodel elements, e.g., existsExceptionOutputPinsets, atMostOneInitNode. In addition, T-code analyzer tool 6 can auto-generate predicates by analyzing the model transformations. An example of how state space predicates can be automatically generated from transformation code is described in the following.

The Eclipse Modeling Framework (EMF) is very widely used as a basis for model exchange and manipulation, including implementation of model transformations. A metamodel description in XMI (XML (Extensible Markup Language) Metadata Interchange) or another form is used by the EMF tools to generate Java classes that can be programmatically manipulated through a number of standard operations (e.g. EMF generates Factory classes to be used for element creation). Assuming that the transformation developer uses the operations provided by EMF to manipulate model elements (he is not required to do so), transformation code can be analyzed as follows to determine what parts of the metamodel are affected by a particular transformation and how they are affected (i.e. whether elements are created, edited or deleted).

Code Analysis Steps

Input: transformation Java code based on EMF

Output: list of metamodel elements of which instances are created, edited or deleted by the transformation 1. Identify lines of code that are potentially executed during the transformation:

analyze call hierarchy starting from the main method of the transformation     (existing techniques known from compiler theory can be used for this as will be apparent to those skilled in the art)

2. Analyze each line of code for EMF model changing operations, for example:
- element creation: lines of codes containing "Factory.eINSTANCE.create"
- element deletion: lines of codes containing "EcoreUtil.remove"
- attribute change: lines of codes containing ".set"
- addition to a container attribute: lines of codes containing ".get" followed by ".add"
- removal from a container attribute: lines of codes containing ".get" followed by ".remove"
- removal of all elements from a container attribute: lines of codes containing ".get" followed by ".clear"

3. Determine affected class for each element changing operation:
- for each of the changing operations identified in the previous step, the affected class may be determined in a different way;
- for element creation, it is the string following "create" in the method name;
- for addition to a container attribute, the declaration of the variable at hand must be found in the code, e.g. for "node.getInputObjectPins( ).add(newPin);", the declaration of "node" is considered to determine which class it instantiates.

Figure 3:
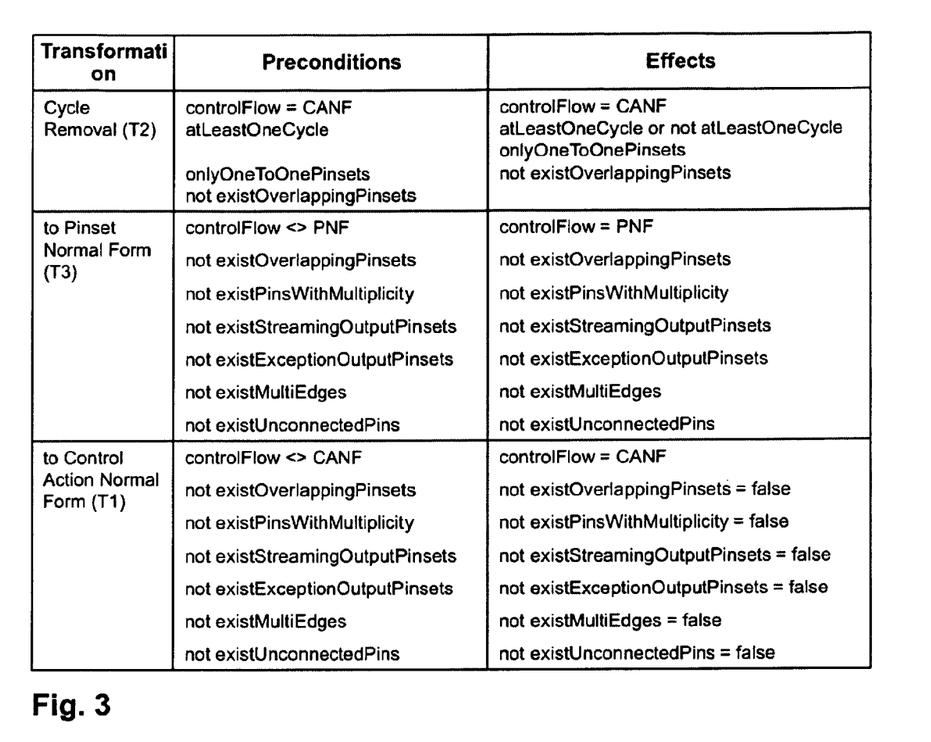
FIG. 3 shows exemplary contracts associated with transformations for use in operation of the system.

Once the set of predicates for the state space abstraction has been defined, the next setup stage is the development of a contract for each transformation. A contract is a semantic description of the transformation which contains the preconditions and effects for that transformation in terms of the state space predicates. That is, each contract specifies those predicates which a model must possess for the transformation to be applicable (preconditions) as well as the modified set of predicates resulting from execution of the transformation (effects). With the aid of the T-code analyzer tool 6, an operator (e.g. the transformation developer) can produce the contracts by appropriate analysis of the transformation code, and suitable implementations will be apparent to those skilled in the art. By way of illustration, the table of FIG. 3 shows exemplary contracts for three transformations T1, T2 and T3 based on the state space abstraction of FIG. 2. Note here that the Cycle Removal transformation T2 is non-deterministic, there being two possible output states based on the predicate "atLeastOneCycle" being either true (atLeastOneCycle) or false (not atLeastOneCycle). The significance of this will be discussed below.

The contracts are stored along with the transformations in registry 3 of system 1. Transformation composer 4 can then process these contracts to compute a state machine reflecting the state changes that the transformations imply on a model. More particularly, for each possible execution sequence of transformations in the set, the state machine defines the start and potential end states of a model for each transformation in the sequence. This state machine is automatically generated by state machine generator 7 of transformation composer 4 using the following algorithm to processing the transformation contracts.

Input: Set T of available transformations where each transformation t is associated with a set of preconditions P_t and n alternative sets of postconditions or effects E_t_1, . . . , E_t_n. If no disjunctions ("or") occur in the postconditions of a transformation (e.g., T1), then there exists exactly one set of postconditions E_t_1. Each disjunction introduces a new set of postconditions. For instance, T2 has two alternative sets of postconditions, namely E_t_1={controlFlow=CANF, atLeastOneCycle,onlyOneToOnePinsets, not existOverlappingPinsets} and E_t_2={controlFlow=CANF, not atLeastOneCycle,onlyOneToOnePinsets, not existOverlappingPinsets}. Each precondition p and effect e constrain a value of some predicate.

Output: State machine M=(S,D) where S is the set of states and D is the transition relation.

1. Create a predicate set R by collecting all predicates constrained in one or more of the sets P_t, E_t_1, . . . , E_t_n for some transformation t in T. Create a new state machine M=(S,D) and let S be a set of $2^m$ states where m is the number of predicates in R and each state in S is characterized by a unique evaluation of the predicates in R.

Figure 6:
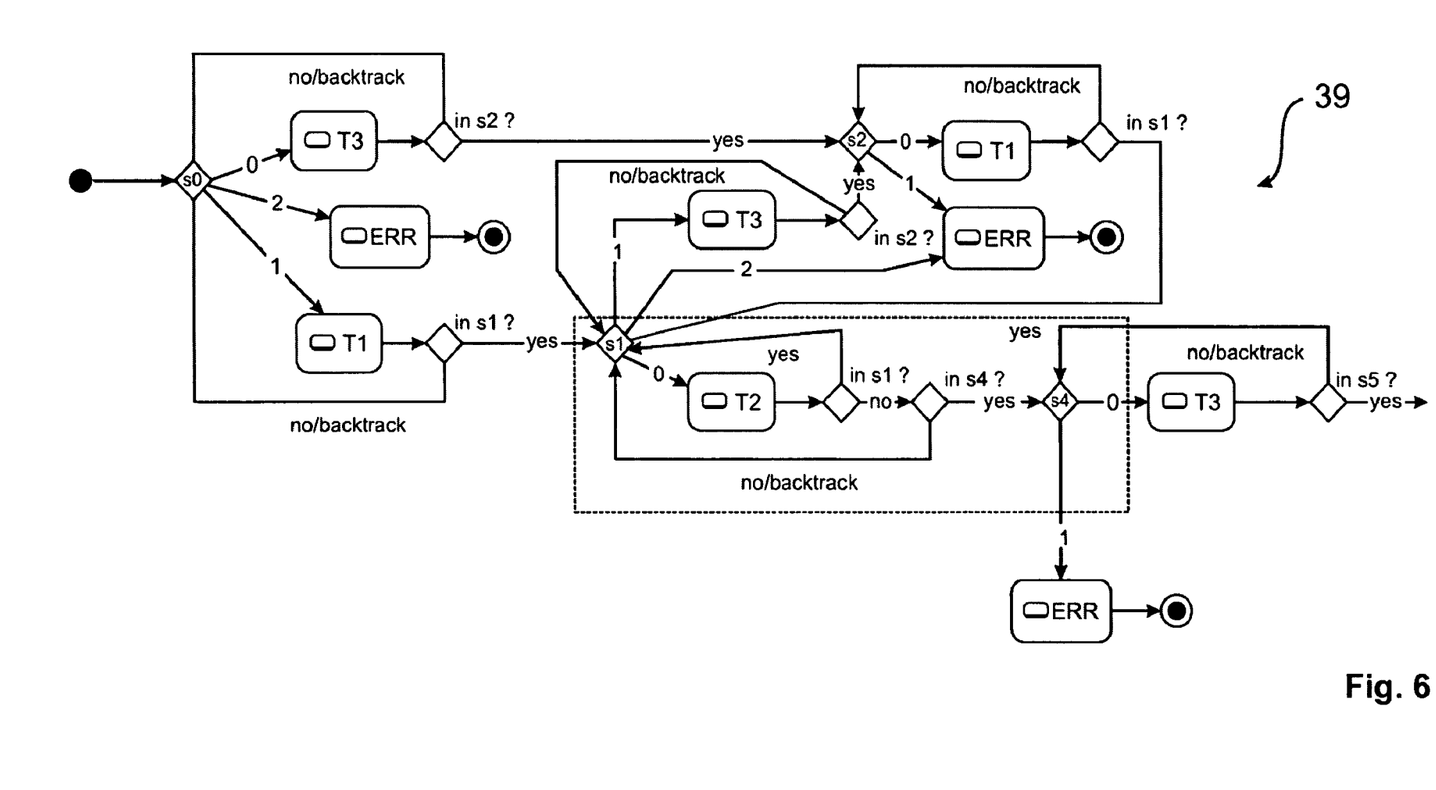
FIG. 6 illustrates a workflow generated by the system for an exemplary transformation composition process.

2. For each transformation t in T:
a) Let S_src be a subset of S, where the preconditions of transformation t are satisfied in each state s_src in S_src.
b) For each s_src in S_src do:
c) For each postcondition set E_t_i of t do:
d) Compute s_tgt_i by changing the predicate evaluation of s_src as follows:
set values of those predicates that appear in E_t_i according to their values in E_t_i
and leave the values of other predicates the same as in s_src
e) Add (s_src, s_tgt_i) to D, thus introducing a new state transition to state machine M In this preferred embodiment, state machine generator 7 also applies the following optional optimization step: Remove all states s from S, if s is not a source or a target state in any of the transitions in D. As a further optional optimization step, the state machine M can be minimized using the well-known minimization techniques for finite automata, as described in the book 'Introduction to Automata Theory, Languages and Computation' by Hopcroft, Motwani, Ullman (2001).

Figure 4:
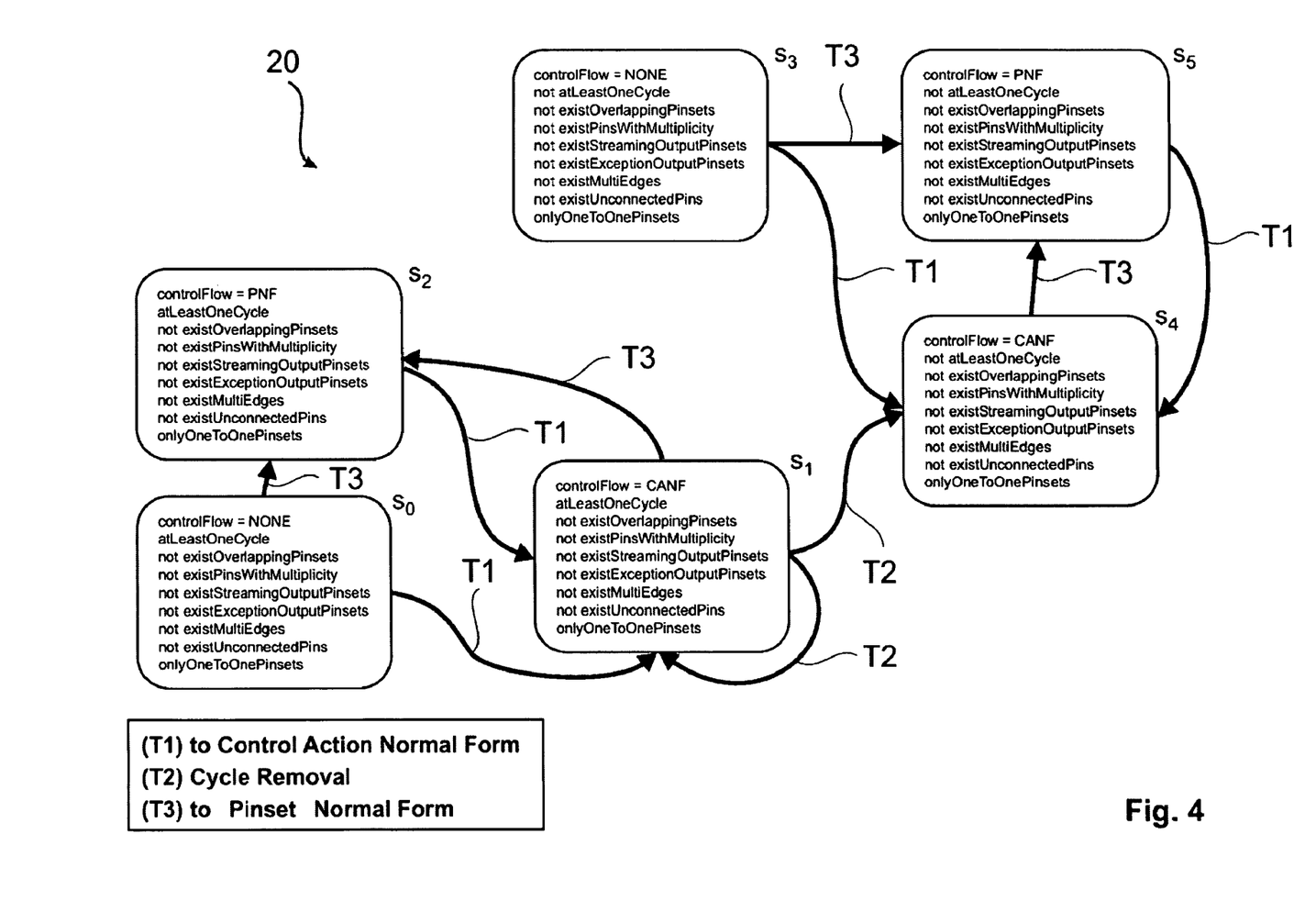
FIG. 4 shows a state machine generated in operation of the system for the transformations of FIG. 3.

FIG. 4 shows the state machine, indicated generally at 20, that is automatically generated by this process using the information from the table of FIG. 3. This includes six states $S_0$ to $S_5$, each representing one possible state of a model in the abstract model state space, with the state transitions being labeled with the name of the transformation that causes that transition. The states $S_0$ to $S_5$ thus correspond to start and/or end states for individual transformations in the possible execution sequences of T1, T2 and T3. Each of these execution sequences represents a particular composite transformation which can be generated by the system from the transformation set T1 to T3. Note that the state machine reflects potential non-determinism of the model transformations, which has consequences for the automatic composition. In the present example, the effect of the non-deterministic Cycle Removal transformation T2 can be seen clearly in FIG. 4: there is a T2 transition from state $S_1$ to both $S_4$ and $S_1$ itself.

Figure 5:
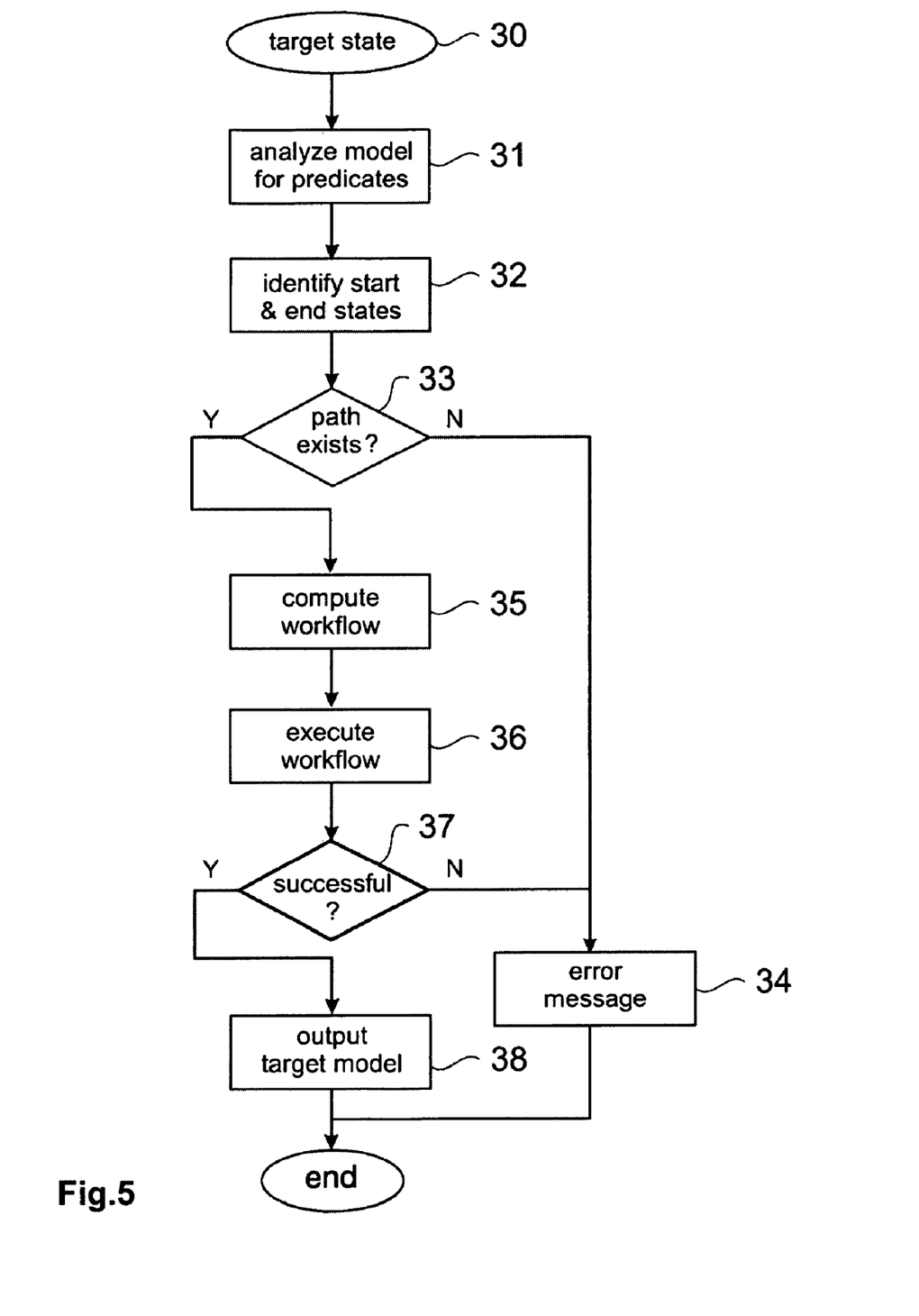
FIG. 5 is a flow chart illustrating operation of a transformation controller in the FIG. 1 system.

The state machine generation process is performed once for a given set of metamodels and transformations, and the resulting state machine is stored in registry 3. The system is then ready for automatic composition of model transformations. In particular, if a user intends to transform a model, the model is input to system 1 and stored in system memory. To invoke the generation of a composite transformation, the user specifies a target state for the input model. The transformation composition process is performed by transformation controller 8 of system 1, and the main steps of this process are indicated in the flow chart of FIG. 5.

The target model state is specified in this embodiment by the user selecting predicates and their values defining the target state from the list of state space predicates offered by transformation controller 8. Definition of the target state is represented by step 30 in FIG. 5. Next, in step 31, transformation controller 8 analyses the input model to identify the state space predicates defining the current state of the model. In step 32 controller 8 then identifies the particular states in the state machine stored in registry 3 which correspond to the current and target states of the input model. These states thus represent the start and end states for the desired composite transformation. In step 33 the controller 8 determines whether a transition path, representing a possible execution sequence of the available transformations, exists between these start and end states. If not, then the user is informed in step 34 that no composite transformation is available and the process terminates. Assuming, however, that a transition path is detected at step 33 then the start and end states are supplied to workflow generator 9. In step 35, workflow generator 9 uses the information in the state machine to compute a workflow including all necessary transformations and possible execution paths between the specified start and end states. The resulting workflow is then executed in step 36 by workflow engine 10. The workflow operation will be described in detail below. Briefly, however, the workflow is constructed such that its execution essentially involves selecting an initial transformation execution sequence between the specified start and end states in the state machine. The transformations in this sequence are then successively executed on the input model. After executing each transformation, the actual transformed input model state is compared to the model state, also called desired model state, as defined in the state machine. If these states do not match, the selected sequence is deemed inoperable for the input model. In this event, the operation selects an alternative execution sequence in the state machine between the input model and target states. The steps of executing transformations and comparing states are then continued until either the target state is achieved for the input model or no alternative execution sequence is available in the state machine. In the latter case, the workflow will be deemed unsuccessful in step 37 of FIG. 5. The transformation controller 8 then proceeds to step 34 of FIG. 5, providing a message to the user indicating that no composite transformation is available, and the process terminates. Assuming, however, that the target model state is achieved by the workflow engine 10, then the workflow is deemed successful in step 37 and the transformed input model, in the desired target state, is output to the user in step 38. The transformation composition process is then complete.

The operation of workflow generator 9 to generate the workflow from the state machine in the above process is described by the following algorithm.

Input: A state machine M, initial state i and final state f

Output: A workflow that contains all possible sequences of transformations that transform the model from the initial state to the final state, including error-handling and dealing with non-determinism.

Let M=(S,D,i,f) be a state machine where S is the set of states, D is the transition relation (S×P×S), where P is the set of transformations, i is the initial node and f is the final node. State f is user chosen as the desired target state and i is chosen by the system as the current state of the model.

1. For each s in S, create a merge node ("state control node")

2. For each (si,pj,sk) in D with si<>f and si and sk on a path from i to f, create task pj and
a) connect si to pj
b) let Sz={s |(si,pj,s) in D}. For each sz in Sz do
  i) create a decision node labeled "In sz?"
  ii) connect edge from pj to the decision node sz, where the "yes" edge leaving each "In sz?" goes to the merge node sz the "no" edge leaving each "In sz?" goes to the next decision node in Sz
unless there is no further decision node; then it goes back to si
as a backtrack edge
(This is illustrated by the grey box in the example of FIG. 6 below).

3. a) Add an initial node and connect it to decision node i;
b) Add a final node and connect f to it 4. Add an outgoing edge from each merge node si<>f to an exception task ERR 5. For each decision node si, number the outgoing "yes" edges with 0,1,2, . . . , where the edge to the exception task gets the highest number. The semantics of the numbered edges are explained in the following.

Sometimes, a transformation t1 can be replaced by a compatible transformation t2 if the following holds: the preconditions of t1 logically imply the preconditions of t2 while the postconditions of t2 imply the postconditions of t1. In this case, t2 can be considered a specialized version of t1. This has two consequences: firstly, it is easy to determine the transformations that can be used to replace a transformation if it failed. Secondly, the edges should be numbered in a way that the most general transformation is numbered 0, while the most general compatible transformation is numbered with the highest number (but lower than the number for the ERR edge).

The effect of the above algorithm is illustrated by the following example. Suppose a user wants a model to be in Pinset Normal Form and not to have a cycle. This model state is represented by state $S_5$ in FIG. 4. Assuming that the current model is in no normal form and it has cycles (state $S_0$), an initial and final node can be identified in the FIG. 4 state machine. The workflow 39 computed by workflow generator 9 using the above algorithm is illustrated in FIG. 6. Consideration of this figure demonstrates that execution of the generated workflow catches errors and also handles non-deterministic actions. Both cases will now be explained in detail.

Each state control node (s0 . . . s5) in FIG. 6 contains a branch counter that is initially 0 for every state control node. When execution of the workflow reaches a state control node, the edge having a number corresponding to the branch counter is taken. For example, T3 is executed in state s0; then it is determined whether the conditions for s2 are satisfied. If this is not the case, error handling comes into play as backtracking. Backtracking increases the branch counter for a state control node. Thus, the control goes back to s0 and the branch counter is increased to 1. Consequently, T1 is executed and the system checks whether the conditions for s1 are satisfied. If this is not the case, backtracking goes back to s0, increasing the branch counter to 2. In this case, there is no other choice than invoking the error handling ERR and terminating the process.

There is one non-deterministic action T2 in this example. After executing T2, the system can be in state s1 or s4. If the system is in neither of the two states, the previously described backtracking mechanism is invoked. Otherwise, the control flow is continued with either s1 or s4.

It will be seen that the above embodiment provides an effective system for the automatic composition of model transformations on demand. The user triggers the computation by specifying a target state for the model, and the system computes a transformation to transform the model into the target state while handling erroneous or non-deterministic transformation steps. In particular, as the workflow engine 10 executes a composite transformation, it checks after each atomic step of the composite transformation whether the actual system state matches the expected system state, i.e. the desired model state, or simply the model state described in the state machine. If it does not match, e.g. due to an erroneous or non-deterministic transformation, corrective action is taken via the backtracking mechanism described above, selecting an alternative composition where available. During execution of the workflow, the output model state is saved after each atomic transformation to allow implementing of the backtracking mechanism. This avoids the need to start each new execution sequence from the start state, preventing unnecessary repetition in the computation process.

While the system 1 has been described for simplicity in terms of operation of a single computer, it will of course be appreciated that elements of the FIG. 1 system could be provided in different physical components of a distributed computer system if desired. In a particular preferred embodiment, the transformation composition system 1 can be realized using concepts of Service Oriented Architecture (SOA). In a nutshell, SOA encapsulates computational actions as Web services, which can be composed using a choreography language, e.g., BPEL (Business Process Execution Language). Each transformation is considered a Web service. Transformations can be composed using a standard Web services choreography language, e.g., Business Process Execution Language (BPEL). Complex transformations can be built from the atomic transformations and deployed as Web services themselves, thus enabling the construction of arbitrarily complex transformations from several components.

Figure 7:
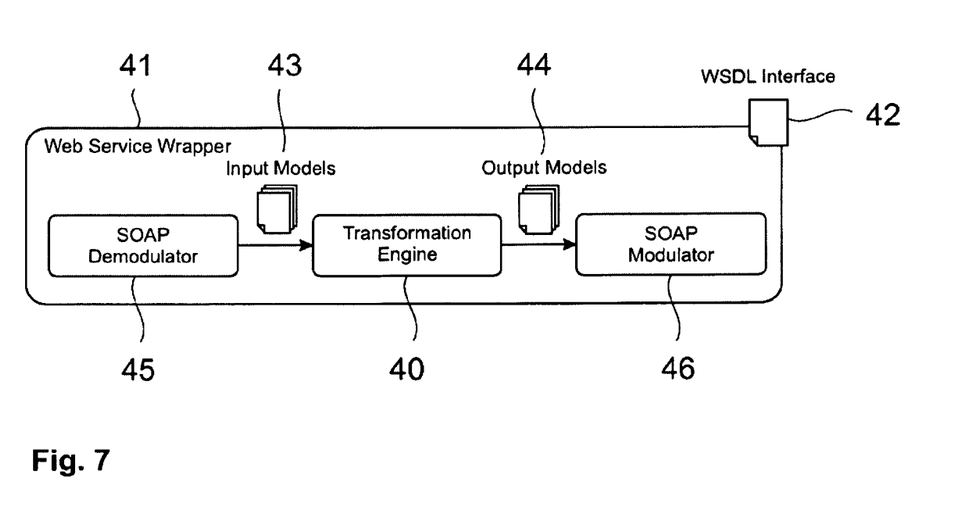
FIGS. 7 to 9 are schematic illustrations of system components for an embodiment implemented in a web services environment.

FIG. 7 illustrates the provision of an atomic transformation as a Web service in accordance with this scheme. Transformation engine 40 is a computer device that automatically performs a transformation on a model. Any existing transformation engine can be embedded in a Web service such that it can be used with this approach. In order to create a Web Service Wrapper 41, the following components are provided: a WSDL (Web Service Definition Language) Interface 42 for the new Web service created from the data schemas for the Input Models 43 and Output Models 44. The WSDL Interface can contain additional service description information as annotation elements. SOAP (Simple Object Access Protocol) messages that are passed to the Web services will be transformed into and from the internal data representation that the transformation engine uses. This is done by a SOAP Demodulator 45 and a SOAP Modulator 46. At present, the most commonly used and standardized message exchange format for invoking service operations is SOAP, typically transferred over HTTP as a transport protocol. Its interoperability is proven in practice. Other message format and transport protocol bindings have been proposed e.g. as part of the Service Component Architecture (SCA) initiative. Using other bindings, e.g. SOAP over Java Messaging Service (JMS) and message-oriented middleware (MOM), or binary formats, would be possible.

Figure 8:
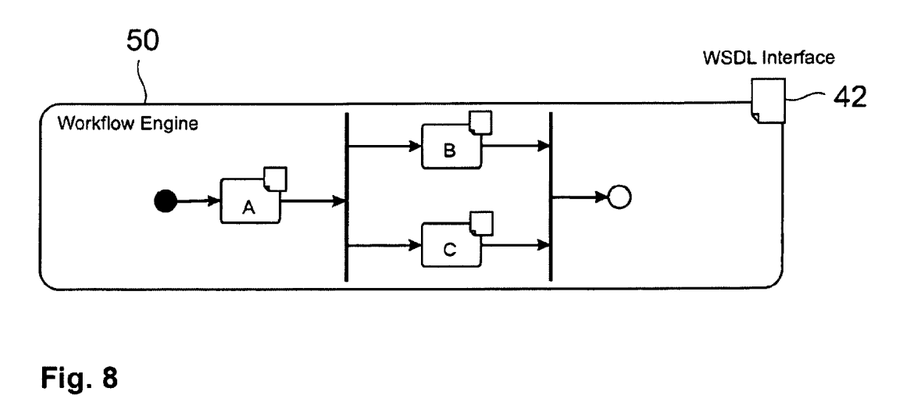

A composite transformation generated by the system as described above can be executed in a workflow engine 50 as illustrated in FIG. 8 and saved for later reuse. In the simple example shown here, the workflow for computation of the composite transformation involves three transformations A, B and C, each implemented as a web service as in FIG. 7. In the engine 50, the control flow and data flow between Web services A, B and C is defined, e.g. using BPEL. The web services are integrated with BPEL invoke actions. The BPEL model can be automatically created by transforming the workflow that was generated for a given composite transformation. The workflow engine is realized as a Web service in itself, having a WSDL Interface 42 defining the data format for incoming and outgoing SOAP messages.

Figure 9:
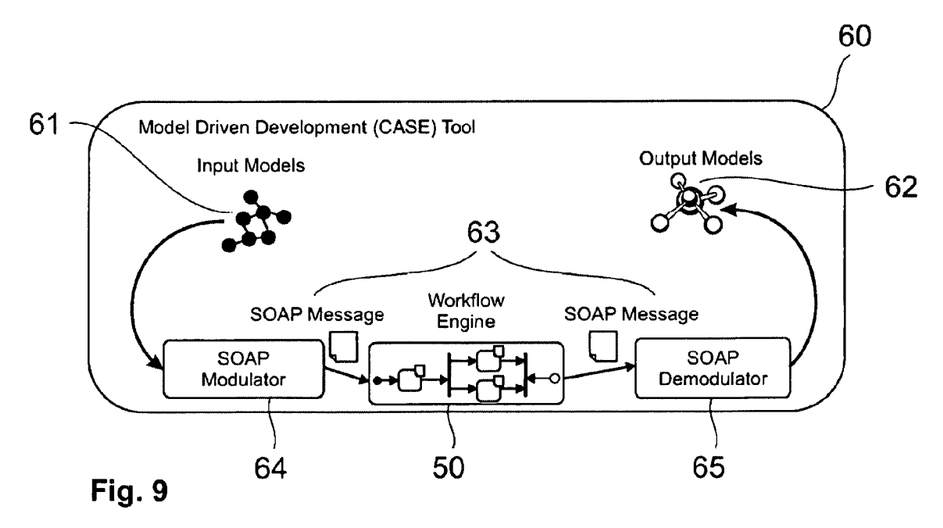

This scheme allows such a workflow engine 50 to be integrated as a plug-in into any existing Model Driven Development Tool. Such a tool is a specialized Computer-Aided Software Engineering (CASE) tool, and is illustrated schematically as tool 60 in FIG. 9. In the CASE tool 60, input models 61 can be created and transformed with the transformation composer into output models 62. Hence the models will be transformed into SOAP Messages 63 that are sent to the workflow engine 50. The SOAP messages are generated from the input models by a SOAP Modulator 64, and the SOAP messages from the workflow engine 50 are transformed into the tool internal data format by a SOAP Demodulator 65.

It will be appreciated that various changes and modifications can be made to the preferred embodiments detailed above. For example, while system 1 above includes mechanisms for deriving the state space abstraction and transformation contracts for any set of transformations in a generalized modeling environment, the analysis tools could be omitted in alternative embodiments dedicated to specific technology areas. Such dedicated systems could simply be supplied with the transformations, state space predicates and state machine ready for use in particular modeling field. In addition, a plurality of state machines, each corresponding to a respective set of transformations and metamodels, could be provided in the same system. Also, while the generation of a workflow from the state machine is advantageous for simplicity of implementation and transparency of operation, other techniques could be employed to derive the composite transformation from the state machine. For example, execution algorithms could be implemented using an imperative programming language, logical programming, or expert system technology as will be apparent to those skilled in the art. Many other changes and modifications can be made to the embodiments described without departing from the scope of the invention.

That which is claimed is:

1. A method for automatic composition of model transformations in a data processing system from a predetermined set of model transformations stored in memory of the system, the method comprising:

providing in the memory a state machine which defines, for all possible execution sequences of transformations in said predetermined set, start and potential end states of a model for each transformation in each execution sequence, said start and potential end states being defined in the state machine in terms of predetermined model attributes;

in response to specification of a target state for an input model to be transformed by the system, selecting an execution sequence in the state machine between a start state corresponding to the input model and an end state corresponding to the target state;

successively executing on the input model each transformation in the selected execution sequence; and after executing each transformation in the selected execution sequence, comparing a transformed input model state resulting from executing each transformation to a model state defined in the state machine to determine if the selected sequence is inoperable for the input model and, if so, selecting an alternative execution sequence in the state machine between the start state corresponding to the input model state and the target state;

wherein the steps of executing transformations and comparing states are continued until either the target state is achieved for the input model or no alternative execution sequence is available in the state machine.

2. A method according to claim 1 wherein the selected sequence is determined to be inoperable for the input model if the transformed input model state does not match the model state defined in the state machine.

3. A method according to claim 1 including, in response to specification of the target state:
generating from the state machine a workflow which includes all possible execution sequences in the state machine between the start state corresponding to the input model and the target state, a configuration of the workflow being such that execution of the workflow implements said steps of executing transformations and comparing states; and
executing the workflow for the input model.

4. A method according to claim 3 including executing the workflow as a Web service.

5. A method according to claim 4 including, in execution of the workflow, executing each transformation as a Web service.

6. A method according to claim 1 including, if the target state is achieved for the input model, supplying the transformed input model in the target state as an output to a user of the system.

7. A method according to claim 1 wherein for each transformation in said predetermined set, a contract is stored in the memory defining preconditions and effects of that transformation in terms of said predetermined model attributes, the method including generating the state machine by processing the contracts for the predetermined set of transformations.

8. A method according to claim 7 including analyzing each transformation to produce said contract and storing the contract in the memory.

9. A method according to claim 8 including, before producing the contracts for transformations:
generating a set of model attributes relevant to the transformation composition process by analyzing attributes of models to be transformed by the system and the operation of transformations in said predetermined set; and
storing the set of model attributes as said predetermined model attributes.

10. A method according to claim 1 including analyzing an input model to be transformed by the system to identify the start state in the state machine which corresponds to the input model.

11. A method according to claim 1 wherein said predetermined model attributes comprise predicates in propositional logic.

12. A computer program product stored in computer readable storage medium comprising:
computer readable program codes coupled to the computer readable memory for automatic composition of model transformations in a data processing system from a predetermined set of model transformations stored in memory of the system, the computer readable program codes configured to cause the program to:
provide in the memory a state machine which defines, for all possible execution sequences of transformations in said predetermined set, start and potential end states of a model for each transformation in each execution sequence, said start and potential end states being defined in the state machine in terms of predetermined model attributes;
in response to specification of a target state for an input model to be transformed by the system, select an execution sequence in the state machine between a start state corresponding to the input model and an end state corresponding to the target state;
successively execute on the input model each transformation in the selected execution sequence; and
after executing each transformation in the selected execution sequence, compare a transformed input model state resulting from executing each transformation to a model state defined in the state machine to determine if the selected sequence is inoperable for the input model and, if so, selecting an alternative execution sequence in the state machine between the start state corresponding to the input model state and the target state;
wherein the operations of executing transformations and comparing states are continued until either the target state is achieved for the input model or no alternative execution sequence is available in the state machine.

13. A system for automatic composition of model transformations from a predetermined set of model transformations, the system comprising memory storing said predetermined set of model transformations and storing a state machine which defines, for all possible execution sequences of transformations in the predetermined set, start and potential end states of a model for each transformation in each sequence, said start and potential end states being defined in the state machine in terms of predetermined model attributes, and a transformation controller adapted, in response to specification of a target state for an input model to be transformed, to:
select an execution sequence in the state machine between a start state corresponding to the input model and an end state corresponding to the target state;
successively execute on the input model each transformation in the selected execution sequence; and
after executing each transformation in the selected execution sequence, to compare a transformed input model state resulting from executing each transformation to a model state defined in the state machine to determine if the selected sequence is inoperable for the input model and, if so, to select an alternative execution sequence in the state machine between the start state corresponding to the input model state and the target state;
wherein the transformation controller is adapted to continue the steps of executing transformations and comparing states until either the target state is achieved for the input model or no alternative execution sequence is available in the state machine.

14. A system according to claim 13 wherein the transformation controller is adapted to determine that the selected sequence is inoperable for the input model if the transformed input model state does not match the model state defined in the state machine.

15. A system according to claim 13 wherein the transformation controller is adapted, in response to specification of the target state, to:
generate from the state machine a workflow which includes all possible execution sequences in the state machine between the start state corresponding to the input model and the target state, the configuration of the workflow being such that execution of the workflow implements said steps of executing transformations and comparing states; and
execute the workflow for the input model.

16. A system according to claim 13 wherein the transformation controller is adapted, if the target state is achieved for the input model, to output the transformed input model in the target state to a user of the system.

17. A system according to claim 13 wherein the transformation controller is adapted to analyze an input model to be transformed by the system to identify the start state in the state machine which corresponds to the input model.

18. A system according to claim 13 wherein said predetermined model attributes comprise predicates in propositional logic.

19. A system for automatic composition of model transformations from a predetermined set of model transformations, the system comprising:
- memory storing said predetermined set of model transformations and, for each transformation, a contract defining preconditions and effects of that transformation in terms of predetermined model attributes;
- a state machine generator adapted for processing the transformation contracts to generate a state machine defining, for all possible execution sequences of transformations in the predetermined set, start and potential end states of a model for each transformation in each sequence, said start and potential end states being defined in the state machine in terms of said predetermined model attributes; and
- a transformation controller adapted, in response to specification of a target state for an input model to be transformed, to:
- select an execution sequence in the state machine between a start state corresponding to the input model and an end state corresponding to the target state,
- successively execute on the input model each transformation in the selected execution sequence, and
- after executing each transformation in the selected execution sequence, to compare a transformed input model state resulting from executing each transformation to a model state defined in the state machine to determine if the selected sequence is inoperable for the input model and, if so, to select an alternative execution sequence in the state machine between the start state corresponding to the input model state and the target state, the transformation controller being adapted to continue the steps of executing transformations and comparing states until either the target state is achieved for the input model or no alternative execution sequence is available in the state machine.

20. A system according to claim 19 wherein the transformation controller is adapted to determine that the selected sequence is inoperable for the input model if the transformed input model state does not match the model state defined in the state machine.

21. A system according to claim 19 wherein the transformation controller is adapted, in response to specification of the target state, to:
- generate from the state machine a workflow which includes all possible execution sequences in the state machine between the start state corresponding to the input model and the target state, the configuration of the workflow being such that execution of the workflow implements said steps of executing transformations and comparing states; and
- execute the workflow for the input model.

22. A system according to claim 19 wherein the transformation controller is adapted, if the target state is achieved for the input model, to output the transformed input model in the target state to a user of the system.

* * * * *